(12) United States Patent
Vaccaro et al.

(10) Patent No.: US 12,224,085 B2
(45) Date of Patent: Feb. 11, 2025

(54) GROMMETS FOR HOLDING CABLES

(71) Applicant: Outdoor Wireless Networks LLC, Claremont, NC (US)

(72) Inventors: Ronald A. Vaccaro, Taylorsville, NC (US); Aviral Joshi, Chicago, IL (US)

(73) Assignee: Outdoor Wireless Networks LLC, Claremont, NC (US)

( * ) Notice: Subject to any disclaimer, the term of this patent is extended or adjusted under 35 U.S.C. 154(b) by 0 days.

(21) Appl. No.: 18/418,443

(22) Filed: Jan. 22, 2024

(65) Prior Publication Data
US 2024/0161947 A1 May 16, 2024

Related U.S. Application Data

(63) Continuation of application No. 17/695,131, filed on Mar. 15, 2022, now Pat. No. 11,923,109.

(60) Provisional application No. 63/177,061, filed on Apr. 20, 2021.

(51) Int. Cl.
*H01B 17/58* (2006.01)

(52) U.S. Cl.
CPC .................. *H01B 17/586* (2013.01)

(58) Field of Classification Search
CPC .................................... H01B 17/586
USPC ........................................... 174/668
See application file for complete search history.

(56) References Cited

U.S. PATENT DOCUMENTS

| 4,361,721 A * | 11/1982 | Massey | H02G 15/013 174/653 |
|---|---|---|---|
| 4,555,589 A | 11/1985 | Osada | |
| 5,277,387 A * | 1/1994 | Lewis | H02G 3/26 248/74.2 |
| 5,443,232 A * | 8/1995 | Kesinger | H02G 3/263 248/62 |
| 5,645,456 A * | 7/1997 | Petersen | H01R 9/03 439/724 |

(Continued)

FOREIGN PATENT DOCUMENTS

JP 5497519 B2 3/2014

OTHER PUBLICATIONS

International Search Report and Written Opinion corresponding to PCT/2022/020318; Mailed Jul. 6, 2022.

(Continued)

*Primary Examiner* — Timothy J Thompson
*Assistant Examiner* — Michael F McAllister
(74) *Attorney, Agent, or Firm* — Myers Bigel, P.A.

(57) ABSTRACT

The present disclosure describes a grommet. The grommet includes a slot extending the length of a main body which provides an entry point for a cable to be inserted into an interior cavity, a plurality of flex retention members extending into the interior cavity configured to grip and secure the cable, and one or more grip enhancement features residing between an inner surface of the main body and the flex retention members. The grip enhancement features are configured to provide additional support to the flex retention members when a cable is inserted into the interior cavity. The grip enhancement features are coupled to or integral with a respective flex retention member and extend radially outwardly therefrom, and each grip enhancement feature is configured to engage or contact the inner surface of the main body when a larger diameter cable is received within the interior cavity of the grommet.

19 Claims, 8 Drawing Sheets

(56) References Cited

U.S. PATENT DOCUMENTS

| | | | |
|---|---|---|---|
| 8,870,132 B2 * | 10/2014 | Sampson | F16L 3/123 |
| | | | 248/65 |
| 9,306,380 B2 * | 4/2016 | Vaccaro | G02B 6/4471 |
| 9,431,815 B1 | 8/2016 | Findley | |
| 9,482,369 B2 * | 11/2016 | Sampson | F16L 3/127 |
| 9,866,004 B2 | 1/2018 | Vaccaro et al. | |
| 9,903,510 B2 | 2/2018 | Joshi et al. | |
| 9,977,214 B2 * | 5/2018 | Vaccaro | G02B 6/4471 |
| 2016/0281881 A1 | 9/2016 | Vaccaro et al. | |
| 2019/0345670 A1 | 11/2019 | Wang et al. | |
| 2020/0041042 A1 | 2/2020 | Vaccaro et al. | |
| 2020/0044432 A1 | 2/2020 | Jackson et al. | |
| 2020/0321761 A1 * | 10/2020 | Varale | H02G 3/32 |
| 2022/0041042 A1 | 2/2022 | Drabon et al. | |

OTHER PUBLICATIONS

International Preliminary Report on Patentability corresponding to PCT/US2022/020318; Issued: Oct. 24, 2023, (10 pages).

* cited by examiner

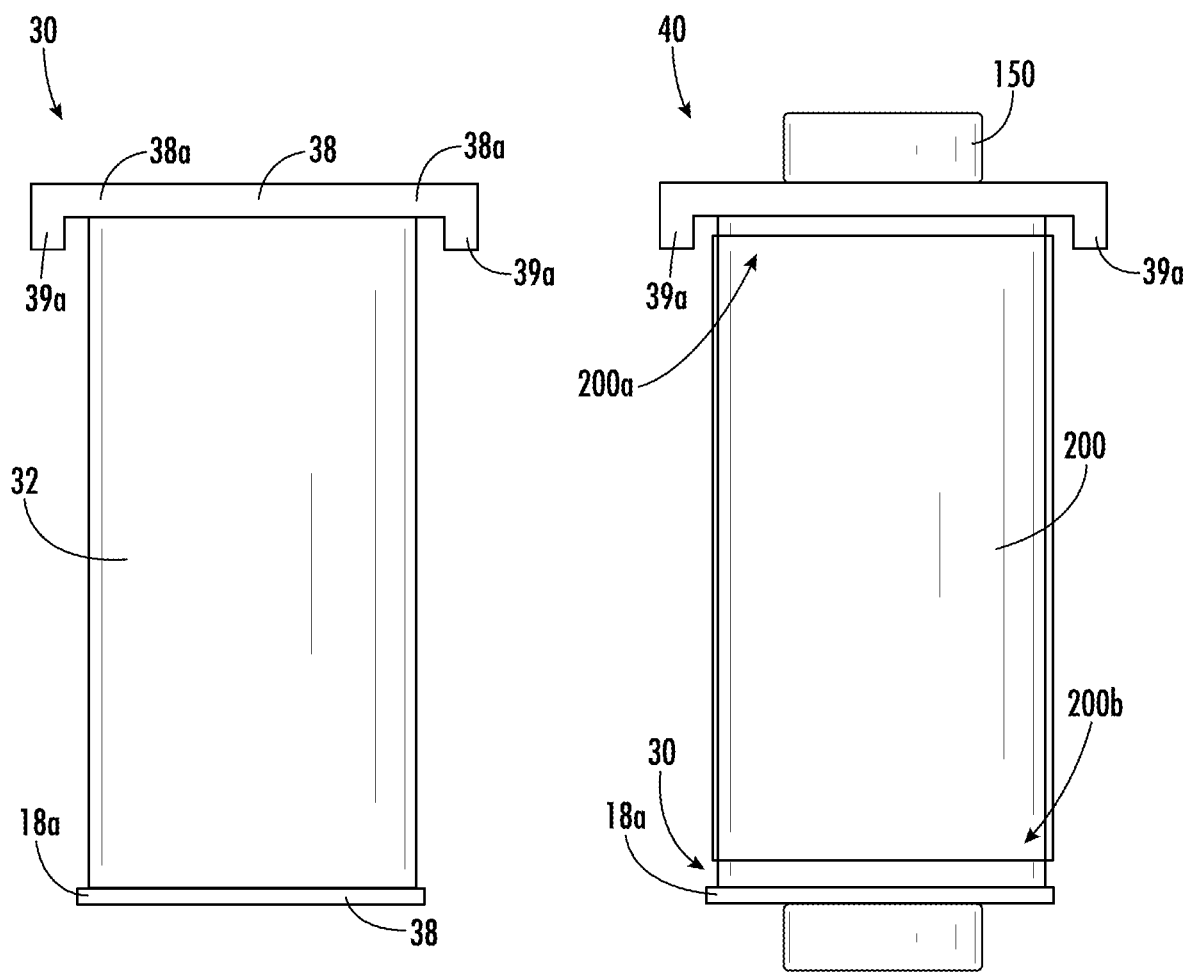
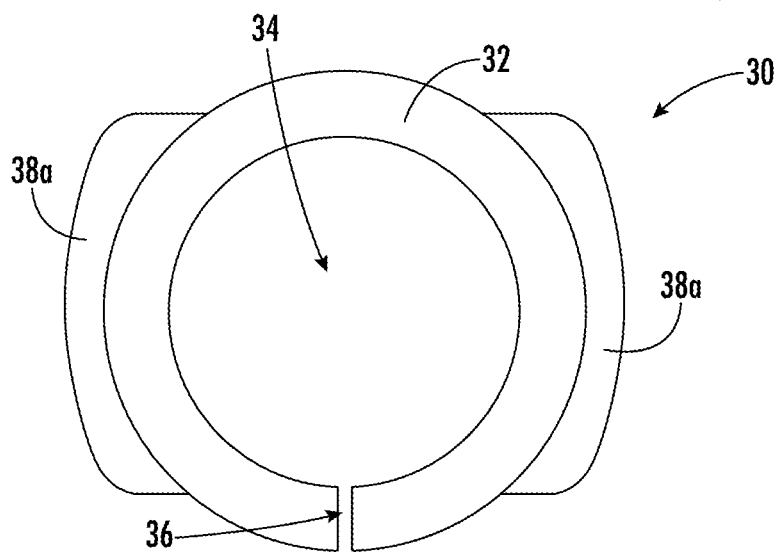
FIG. 2A
FIG. 2C
FIG. 2B

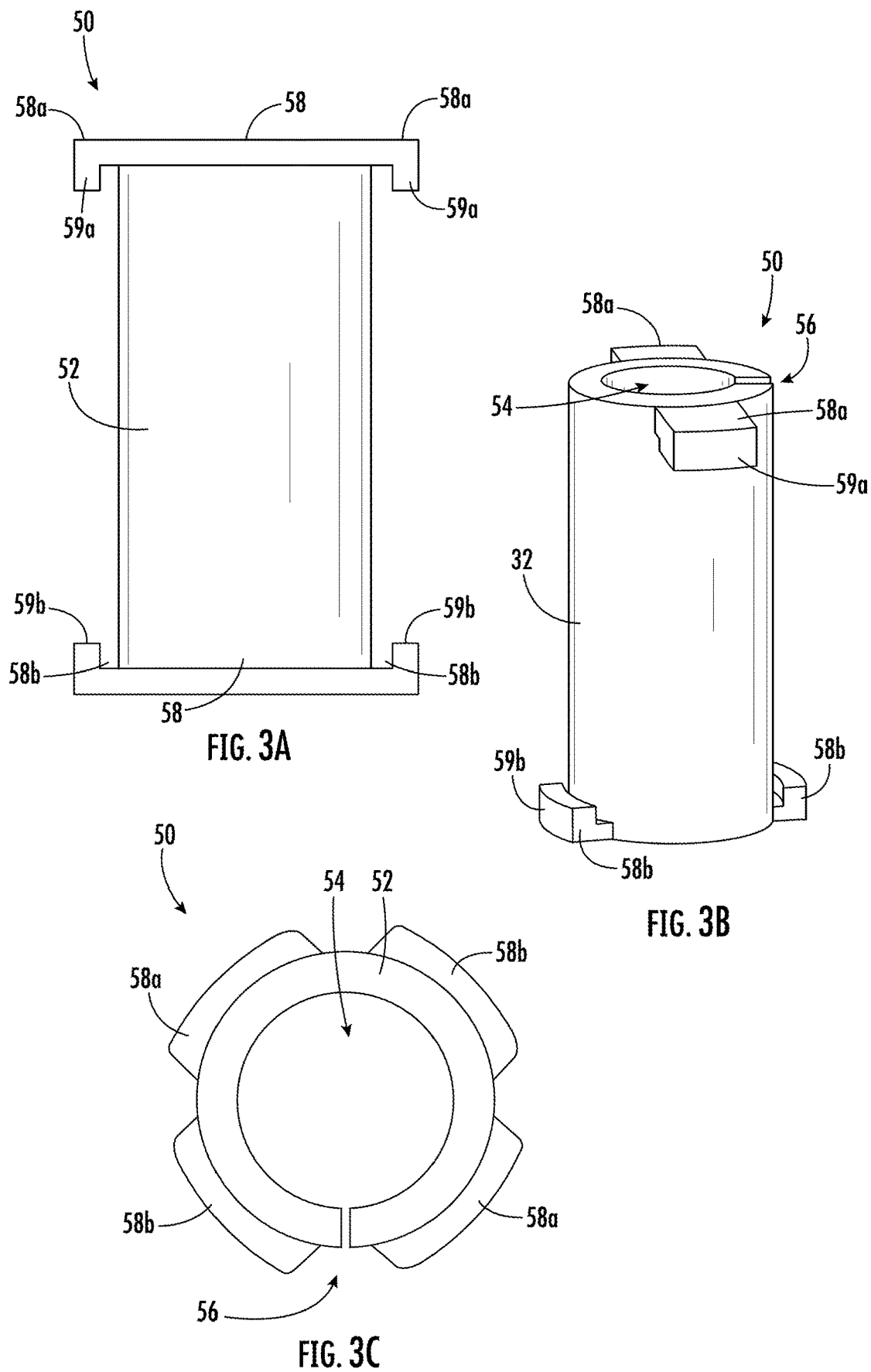

GROMMETS FOR HOLDING CABLES

RELATED APPLICATIONS

The present application is a continuation application of U.S. patent application Ser. No. 17/695,131, filed Mar. 15, 2022, which claims priority from and the benefit of U.S. Provisional Patent Application No. 63/177,061, filed Apr. 20, 2021, the disclosures of which are hereby incorporated herein by reference in full.

FIELD

The invention relates generally to grommets for holding cables.

BACKGROUND

Until recently, antenna towers have typically employed RF coaxial cables for power and/or signal communications. Such cables are often mounted to the tower via cable hangers, which capture the cable and mount it to the tower. One popular variety of cable hanger is a "stackable" hanger, which has the capacity to mount via snap latches to another hanger, thereby enabling multiple cables to be mounted in a "stack"; an exemplary stackable hanger is the Snap-Stak hanger, available from CommScope, Inc. (Joliet, Illinois). Snap-in hangers are often desirable due to their ease of use, although cable hangers that are not stackable are often employed also.

Operators have begun to replace traditional RF cables on towers with fiber optic and/or hybrid fiber/power cables. These new cables (especially the hybrid styles) can have a slightly irregular shape. Also, fiber optic and hybrid fiber/power cables are typically heavy (in some instances three to four times the weight per unit length of traditional RF cable). In addition to being of a slightly irregular shape, the diameter over-jacket (DOJ) of a cable can be vastly different from traditional RF cables.

As a result, in practice some operators use standard hangers in combination with grommets to hang fiber or hybrid fiber cable. The grommets are a fairly soft polymer (e.g., EPDM, nylon, or the like). The outer diameter of the grommet may be sized to fit in the hanger, whereas the inner diameter is configured to grip the fiber/hybrid fiber cable. However, the grommets may not be strong or rigid enough to hold the larger, heavier cables they receive, and may allow the cables to slip from the grommet. As such, modifications to improve the holding of cables via such grommets may be desirable.

SUMMARY

A first aspect of the present invention is directed to a grommet formed of a polymeric material and adapted for securing a cable within a cable hanger. The grommet including a main body having a generally cylindrical profile surrounding an interior cavity and further having a length, a thickness, and a longitudinal axis. The grommet further includes a slot extending the length of the main body which provides an entry point for the cable to be inserted into the interior cavity, a plurality of flex retention members extending into the interior cavity configured to grip and secure the cable within the interior cavity, and one or more grip enhancement features residing between an inner surface of the main body and the flex retention members. The grip enhancement features are configured to provide additional support to the flex retention members when a cable is inserted into the interior cavity. Each of the one or more grip enhancement features are coupled to or integral with a respective flex retention member and extend radially outwardly therefrom, and each grip enhancement feature is configured to engage or contact the inner surface of the main body when a larger diameter cable is received within the interior cavity of the grommet.

Another aspect of the present invention is directed to a grommet formed of a polymeric material and adapted for securing a cable within a cable hanger. The grommet includes a main body having a generally cylindrical profile surrounding an interior cavity and further having a length, a thickness, and a longitudinal axis. The grommet further includes a slot extending the length of the main body which provides an entry point for the cable to be inserted into the interior cavity, a plurality of flex retention members extending into the interior cavity configured to grip and secure the cable within the interior cavity, and one or more grip enhancement features residing between an inner surface of the main body and the flex retention members. The grip enhancement features are configured to provide additional support to the flex retention members when a cable is inserted into the interior cavity. Each of the one or more grip enhancement features are coupled to or integral with the inner surface of the main body and extend radially inwardly therefrom, and each grip enhancement feature is configured to engage or contact a respective flex retention member when a larger diameter cable is received within the interior cavity of the grommet.

Another aspect of the present invention is directed to a grommet formed of a polymeric material and adapted for securing a cable within a cable hanger. The grommet includes a main body having a generally cylindrical profile surrounding an interior cavity and further having a length, a thickness, and a longitudinal axis. The grommet further includes a slot extending the length of the main body which provides an entry point for the cable to be inserted into the interior cavity, a plurality of flex retention members extending into the interior cavity configured to grip and secure the cable within the interior cavity, and one or more grip enhancement features residing between an inner surface of the main body and the flex retention members. When a cable resides within the interior cavity of the main body, the grip enhancement features are configured to provide additional support to the flex retention members to secure and hold the cable within the grommet.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 2A is a side view of a heavy duty grommet.

FIG. 2B is a top view of the grommet of FIG. 2A.

FIG. 2C is a side view of the grommet of FIG. 2A in combination with a cable and secured within a cable hanger.

FIG. 3A is a side view of a heavy duty grommet.

FIG. 3B is a perspective view of the grommet of FIG. 3A.

FIG. 3C is a top view of the grommet of FIG. 3A.

DETAILED DESCRIPTION

Figure 1A:
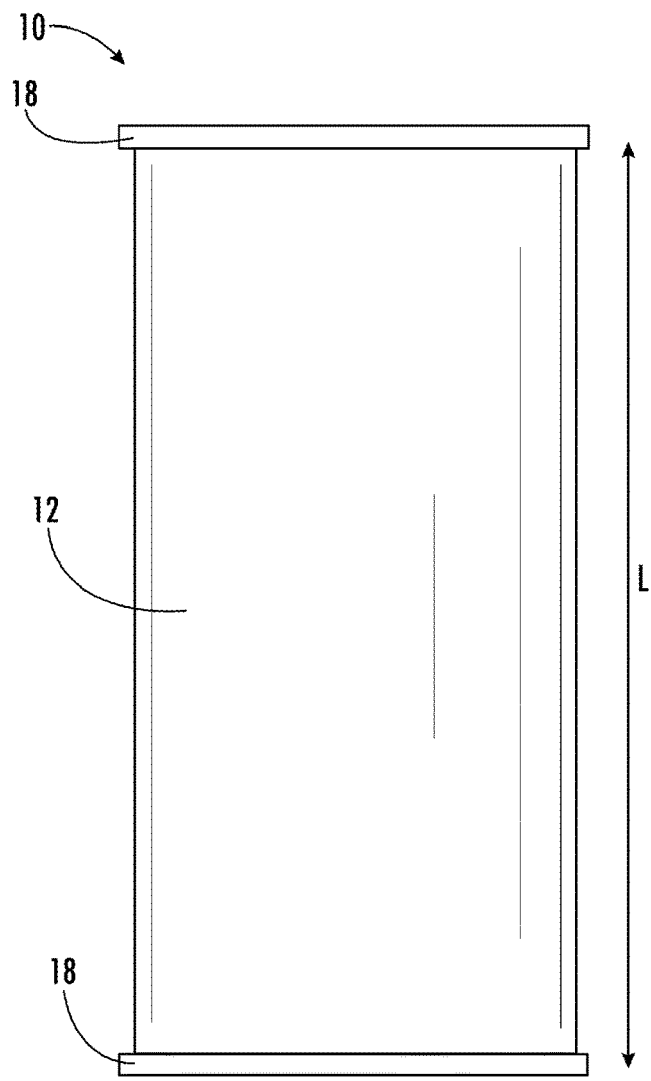
FIG. 1A is a side view of a light or standard duty grommet.
Figure 1B:
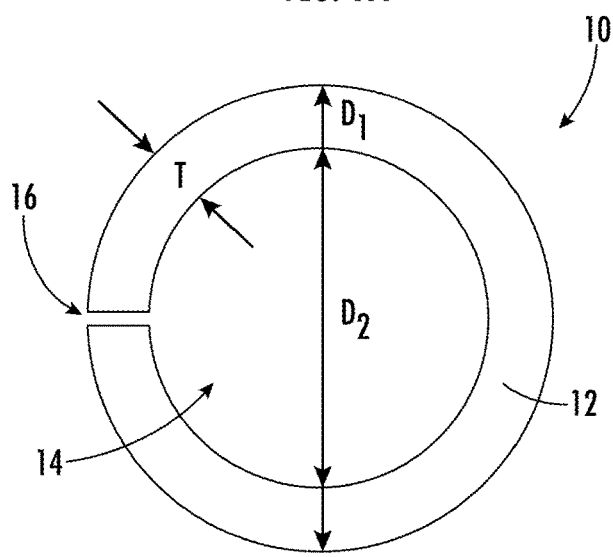
FIG. 1B is a top view of the grommet of FIG. 1A.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components, or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer, or section. Thus, a first element, component, region, layer, or section discussed below could be termed a second element, component, region, layer, or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Figure 1C:
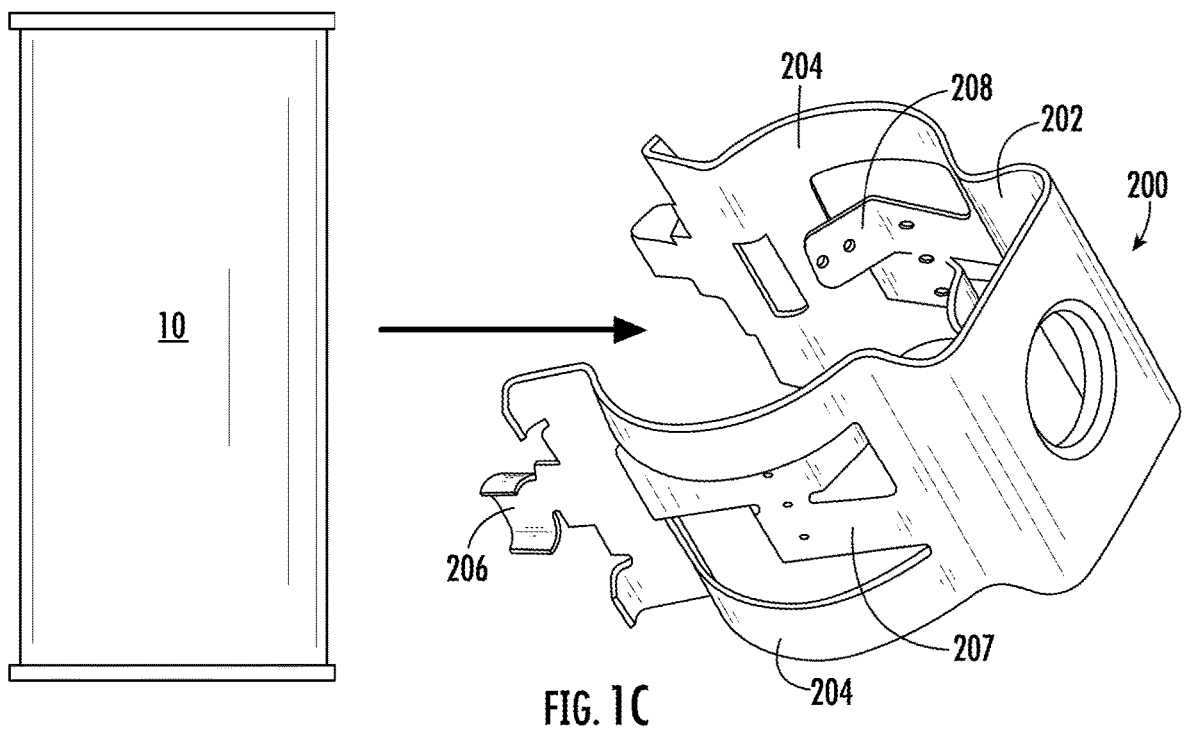
FIG. 1C is an exploded perspective view showing the grommet of FIG. 1A in combination with a cable hanger.
Figure 1D:
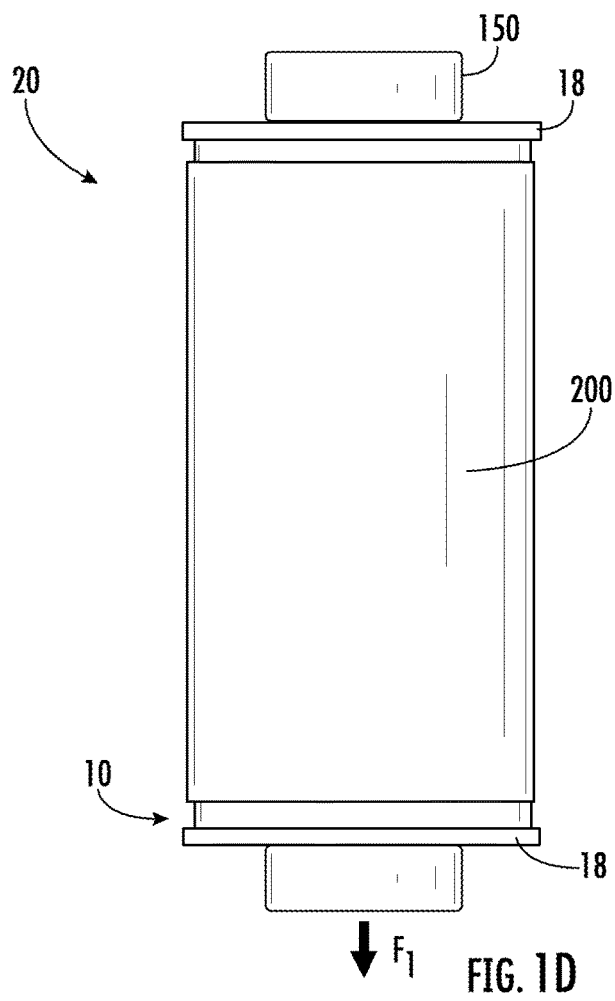
FIG. 1D is a side view of the grommet of FIG. 1A in combination with a cable and secured within a cable hanger.

Referring now to the figures, a grommet 10 adapted for use with a cable hanger 200 is illustrated in FIGS. 1A-1D. The grommet 10 shown in FIGS. 1A-1D is sometimes known as a "light" or "standard duty" grommet Exemplary grommets are described in U.S. Patent Application Publication No. 2019/0345670 to Wang et al. and U.S. Patent Application Publication No. 2020/0041042 to Vaccaro et al., the disclosures of which are hereby incorporated herein in their entireties. The grommet 10 comprises a main body 12 having two ends 18. The main body 12 surrounds an interior cavity 14. The grommet 10 is formed of a polymeric material and is adapted for holding a cable 150 within a cable hanger 200 (FIGS. 1C and 1D). For example, the grommet 10 may comprise rubber (e.g., EPDM), polypropylene, nylon, acetal, acrylonitrile butadiene styrene (ABS), or the like. The main body 12 of the grommet 10 has a length (L), a thickness (T), and a longitudinal axis defined by its length dimension. The main body 12 may have an outer diameter ($D_1$) and an inner diameter ($D_2$). The thickness (T) of the main body 12 can be determined by subtracting the inner diameter ($D_2$) from the outer diameter ($D_1$) and dividing by two. The diameters ($D_1$, $D_2$) of the main body 12 can vary depending on the diameter of the cable 150 being held within the grommet 10.

The main body 12 may have a slot 16 extending along its length (L). The slot 16 provides an entry point for the cable 150 to be inserted into the interior cavity 14. The polymeric material that forms the grommet 10 gives the grommet 10 a certain degree of flexibility, such that the grommet 10 may be deflected to an open position to enable insertion of the cable 150. Once the cable 150 is positioned within the interior cavity 14 of the grommet 10, the resilient nature of polymeric material allows the grommet 10 to recover to its original size, thereby securing the cable 150 within the grommet 10. Exemplary types of cables 150 that may be secured within the grommet 10 include, but are not limited to, fiber optic cables and hybrid fiber/power cables.

Coaxial cables for power and/or signal communications are often mounted to a foundation structure, e.g., an antenna tower, via cable hangers 200, which capture the cable 150 and mount it to the structure (see, e.g., FIGS. 1C and 1D). As shown in FIG. 1C, the cable hanger 200 may include a generally C-shaped body 202 having two opposable arms 204. The opposable arms 204 may have latches 206 that extend away from the cable hanger body 202.

Some cable hangers 200 may have flex members 207 with gripping members 208, thereby further securing the grommets described herein within the cable hanger 200. Exemplary cable hangers are shown in U.S. Pat. No. 9,306,380 to Vaccaro, U.S. Pat. No. 9,866,004 to Vaccaro et al., and U.S. Pat. No. 9,903,510 to Joshi et al., each of which are incorporated by reference in their entirety herein. The combination of the grommets described herein and cable hanger 200 can be mounted to the foundation structure via the latches 206.

The ends 18 of the grommet 10 may protrude from the main body 12 to provide additional stability when the grommet 10 is used with a cable hanger 200. However, in some instances, when an excessive (load) force $F_1$ is applied to (or by) a cable 150 (e.g., the cable 150 is pulled or a heavier weighted cable is used) that is held within the grommet 10 and secured within the cable hanger 200 (e.g., cable hanger assembly 20 shown in FIG. 1D), the small, pliable/flexible protruding ends 18 of the grommet 10 may not provide sufficient support to hold the grommet 10 within the cable hanger 200, and thus, may result in the grommet 10 being pulled away from the cable hanger 200 (i.e., no longer being secured within the cable hanger 200).

To overcome this potential issue, a grommet 30 illustrated in FIGS. 2A-2C may be used instead of the light or standard duty grommet 10. The grommet 30 shown in FIGS. 2A-2C is sometimes known as a "heavy duty" grommet. As shown in FIGS. 2A-2C, the grommet 30 differs from grommet 10 in that one of the ends 38 of the grommet 30 includes opposing arms (or "wings") 38a. Each arm 38a may include a flanged edge 39a extending outwardly and generally parallel to the main body 32 of the grommet 30. As shown in FIG. 2C, when an excessive (load) force $F_1$ is applied to (or by) the cable 150 held within the grommet 30 and secured within the cable hanger 200 (e.g., cable hanger assembly 40), the flanged edge 39a of the arms 38a are configured to engage an upper edge 200a of the cable hanger 200, thereby preventing the grommet 30 from being pulled from the cable hanger 200.

However, as shown in FIGS. 2A and 2C, the arms 38a with the flanged edges 39a only reside at one end 38 of the grommet 30, and the opposing end 38 of the grommet 30 has similar protruding ends 18a as the light or standard duty grommet 10 discussed above (i.e., small and pliable/flexible). Thus, the flanged edges 39a of the grommet 30 are directional in their designed function. In some instances, a technician may install the grommet 30 upside down (i.e., with the flanged edges 39a adjacent to the lower edge 200b of the cable hanger 200), thereby allowing the heavy duty grommet 30 to be just as easily pulled away from the cable hanger 200 as the light or standard duty grommet 10 when an excessive load force $F_1$ is applied thereto.

To overcome this potential issue, a grommet 50 illustrated in FIGS. 3A-4B may be used instead of the heavy duty grommet described above. As shown in FIGS. 3A-3C, the grommet 50 differs from grommet 30 (and grommet 10) in that both ends 58 of the grommet 50 include opposing arms (or wings) 58a, 58b that extend radially outwardly from the ends 58 of the grommet 50, i.e., top arms 58a and bottom arms 58b. Each arm 58a, 58b may include a flanged edge 59a, 59b. The flanged edges 59a, 59b extend downwardly and generally parallel to the main body 52 of the grommet 50, i.e., the flanged edges 59 of the top arms 58a extend downwardly and the flanged edges 59b of the bottom arms extend upwardly. Similar to the grommet 30 described above, the flanged edges 59a, 59b of the grommet 50 are configured to engage respective upper and lower edges 200a, 200b of a cable hanger 200, thereby preventing the grommet 50 from being pulled from the cable hanger 100 in either direction (see, e.g., cable hanger assembly 60 in FIG. 4B). The arms 58a, 58b (and flanged edges 59a, 59b) of the grommet 50 allow the grommet 50 to resist an excessive force (e.g., load) $F_1$, $F_2$ from either direction (i.e., non-directional assembly) (see, e.g., FIG. 4B), and enable a technician to install the grommet 50 either "upside-down" or "right-side-up" without impacting the effectiveness of the grommet 50 in holding cable.

As shown in FIGS. 3B and 3C, each of the top arms 58a and each of the bottom arms 58b are spaced apart by approximately 180 degrees. Also, as shown in FIGS. 3B-3C, the top arms 58a may be circumferentially staggered or offset from the bottom arms 58b. By staggering the arms 58a, 58b of the grommet 50, during manufacturing, the mold halves forming the part may separate without being obstructed by the arms 58a, 58b at the opposite end of the grommet 50, thereby making manufacturing the grommet 50 easier and less expensive than it would be if the arms 58a, 58b were circumferentially aligned with each other.

Figure 4A:
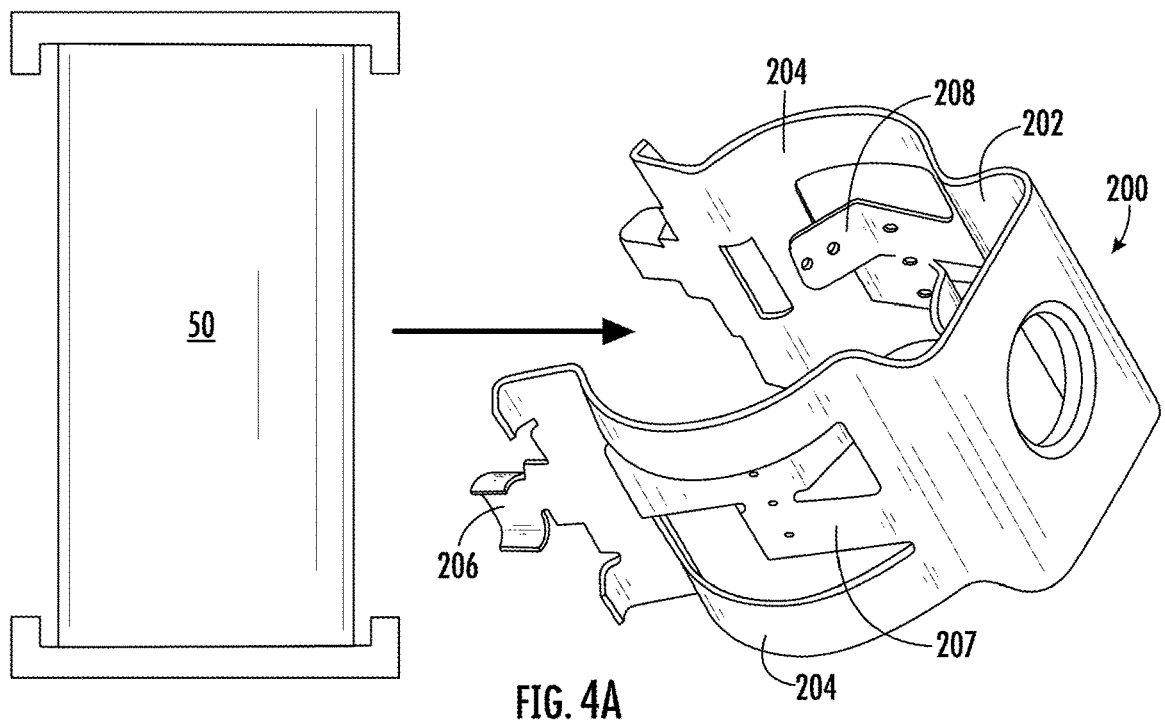
FIG. 4A is an exploded perspective view showing the grommet of FIG. 3A in combination with a cable hanger.
Figure 4B:
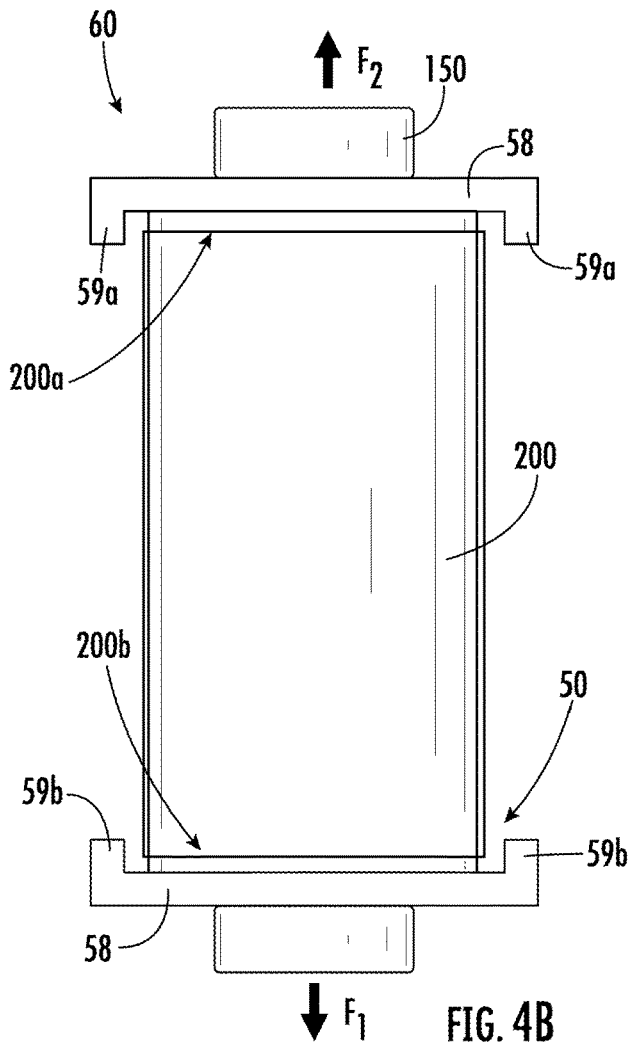
FIG. 4B is a side view of the grommet of FIG. 4A in combination with a cable and secured within a cable hanger.

Referring to FIGS. 4A-4B, and as discussed herein, the grommets 10, 30, 50 may be used in combination with a cable hanger 200. In some embodiments, the cable hanger 200 may be dimensioned to receive the grommet 10, 30, 50 such that the grommet 10, 30, 50 can be held between the opposable arms 204 of the cable hanger 200, with the flanged edges 59a, 59b engaging the upper and lower edges 200a, 200b of the cable hanger 200.

Figure 5A:
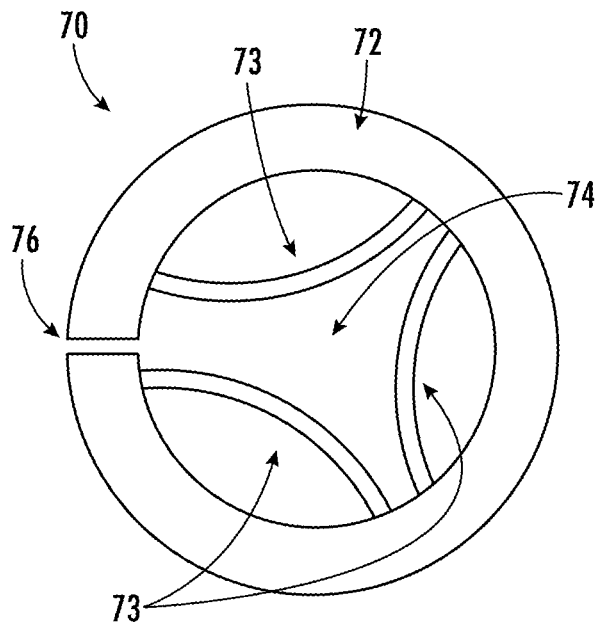
FIG. 5A is a top view of a grommet according to embodiments of the present invention.
Figure 5B:
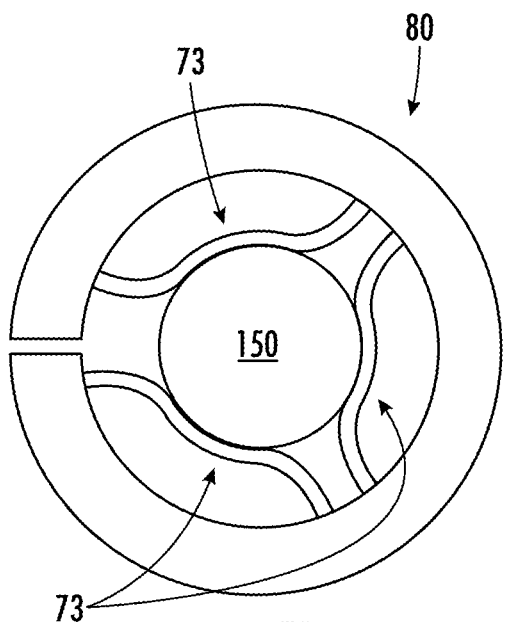
FIG. 5B is a top view of the grommet of FIG. 5A in combination with a cable.

Referring to FIGS. 5A-5B, a grommet 70 and grommet assembly 80 (i.e., grommet 70 in combination with a cable 150) are illustrated. As shown in FIG. 5A, the grommet 70 has a generally cylindrical main body 72 surrounding an interior cavity 74. Similar to the grommets 10, 30, 50 described above, the main body 72 of grommet 70 may have a slot 76 extending along its length which provides an entry point for the cable 150 to be inserted into the interior cavity 74. The grommet 70 also has a plurality of flex retention members 73 extending into the interior cavity 74. The flex retention members 73 may have an arcuate profile and extend axially for some portion of the length of the grommet 70.

The flex retention members 73 may be adapted for gripping a cable 150 when the cable 150 is placed within the interior cavity 74 of the grommet 70 (see, e.g., FIG. 5B). The flex retention members 73 may be formed of a polymeric material which gives the flex retention members 73 a certain degree of flexibility. For example, the polymeric material forming the flex retention members 73 may comprise rubber, polypropylene, polyethylene, ethylene propylene diene monomer (EPDM) rubber, silicone, or the like.

As shown in FIG. 5B, this flexibility allows the flex retention members 73 to deflect to enable insertion of a cable 150 within the grommet 70. Once a cable 150 is positioned within the grommet 70 (i.e., grommet assembly 80), the resilient nature of the polymeric material allows the flex retention members 73 to recover, thereby gripping the cable 150 and securing the cable 150 within the interior cavity 74 of the grommet 70. The flexibility of the flex retention members 73 allows the grommet 70 to be used with a wide range of diameters of cables 150. Notably, the magnitude of gripping force provided by the flex retention members 73 is proportional to the degree to which they are deflected, such that larger cables 150 generate (and receive) a higher gripping force). However, in some instances, larger, heavier cables 150 may tend to slip through the flex retention members 73 because the flex retention members 73 are too flexible and/or weak to secure the heavier cables within the grommet 70.

Figure 6A:
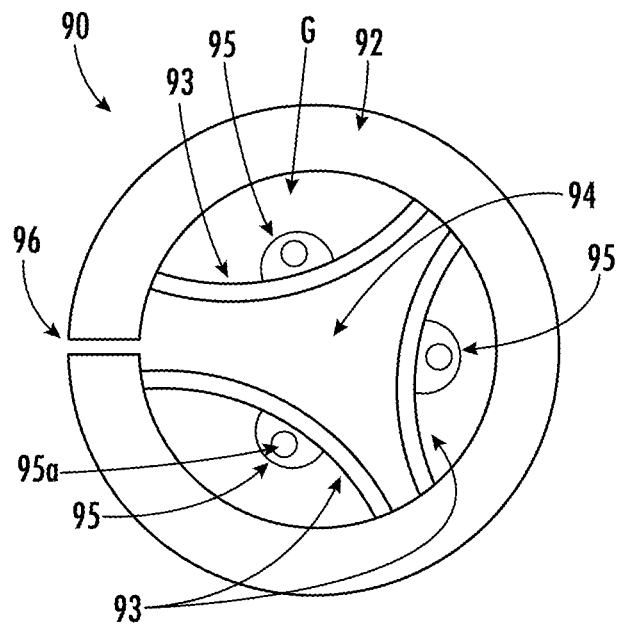
FIG. 6A is a top view of an alternative grommet according to embodiments of the present invention.
Figure 6B:
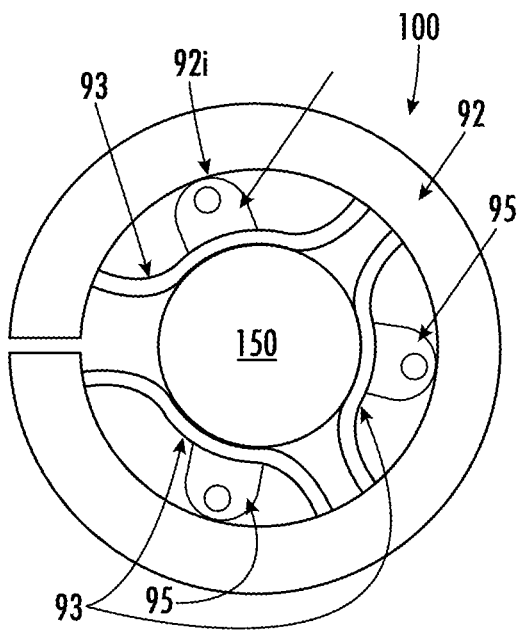
FIG. 6B is a top view of the grommet of FIG. 6A in combination with a cable.

Referring to FIGS. 6A-6B, a grommet 90 and grommet assembly 100 according to embodiments of the present invention are illustrated. Properties and/or features of the grommet 90 and grommet assembly 100 may be as described above in reference to the grommet 70 and grommet assembly 80 shown in FIGS. 5A-5B and duplicate discussion thereof may be omitted herein for the purposes of discussing FIGS. 6A-6B.

Similar to the grommet 70 described herein, the grommet 90 of the present invention has a generally cylindrical main body 92 surrounding an interior cavity 94. The main body 92 of the grommet 90 may have a slot 96 extending along its length which provides an entry point for the cable 150 to be inserted into the interior cavity 94. The grommet 90 also has a plurality of flex retention members 93 extending into the interior cavity 94.

As shown in FIGS. 6A-6B, the grommet 90 differs from grommet 70 in that the grommet 90 includes one or more grip enhancement features 95 coupled to or integral with, and extending radially outwardly from, each flex retention members 93. In some embodiments, the grip enhancement features 95 are configured to engage an inner surface 92$i$ of the main body 92 when a larger cable 150 is received within the interior cavity 94 of the grommet 90 (see, e.g., grommet assembly 100 shown in FIG. 6B). The grip enhancement features 95 may not be "activated" when smaller, lighter cables 150 are used with the grommet 90. However, in some embodiments, as shown in FIG. 6B, a larger cable 150 inserted into the interior cavity 94 of the grommet 90 will cause the grip enhancement features 95 to close the gap G between the grip enhancement feature 95 and the inner surface 92$i$ of the grommet 90 and make contact therewith, thereby providing additional support to the flex retention members 93 to secure and hold the larger, heavier cable 150 within the grommet 90.

Also shown in FIGS. 6A-6B, in some embodiments, each grip enhancement feature 95 may include an aperture 95$a$. The purpose of the aperture 95$a$ is to "tune" the spring constant of the grip enhancement feature 95 to help improve flexibility of the grip enhancement feature 95, and thus, improve flexibility of the flex retention members 93. This may allow the flexibility and strength of the grommet 90 to be balanced, as desired, to accommodate different sized/weighted cables 150.

Figure 7A:
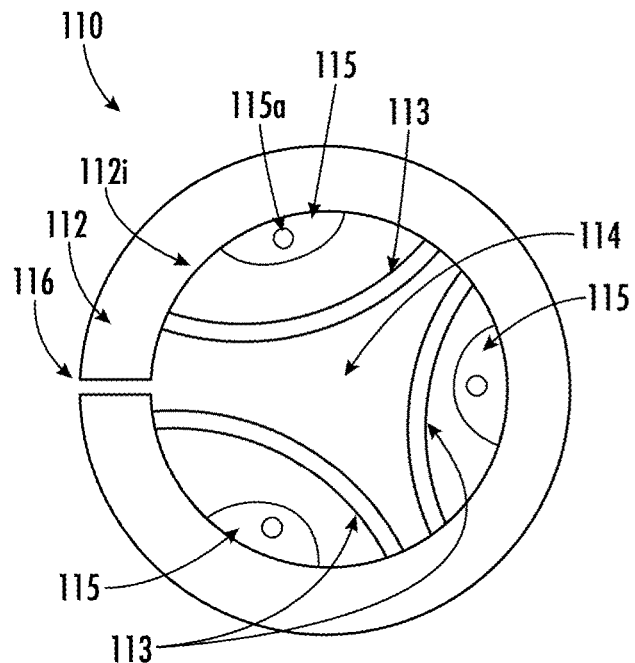
FIG. 7A is a top view of another alternative grommet according to embodiments of the present invention.
Figure 7B:
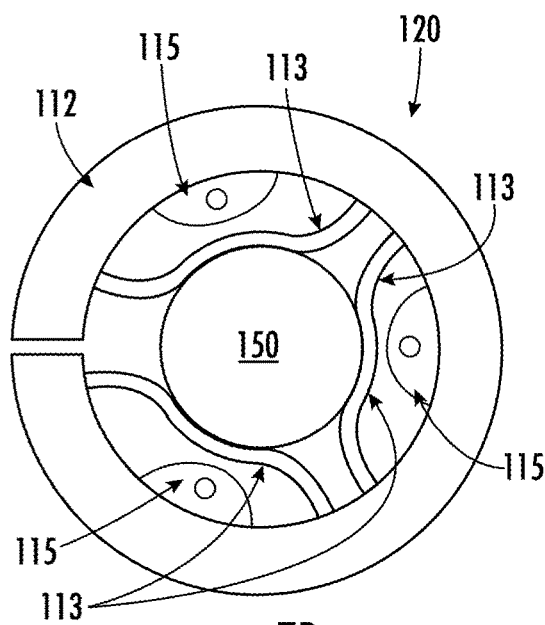
FIG. 7B is a top view of the grommet of FIG. 7A in combination with a cable.

Referring to FIGS. 7A-7B, a grommet 110 and grommet assembly 120 according to embodiments of the present invention are illustrated. Properties and/or features of the grommet 110 and grommet assembly 120 may be as described above in reference to the grommet 90 and grommet assembly 100 shown in FIGS. 6A-6B and duplicate discussion thereof may be omitted herein for the purposes of discussing FIGS. 7A-7B.

The grommet 110 and grommet assembly 120 are identical to the grommet 90 and grommet assembly 100 described herein except that the grip enhancement features 115 of grommet 110 are coupled to or integral with the inner surface 112$i$ of the main body 112 and extend radially inward toward the interior cavity 114 of the grommet 110 (see, e.g., FIG. 7A).

As shown in FIG. 7B, each grip enhancement feature 115 is configured to engage a respective flex retention member 113 when a larger cable 150 is received within the interior cavity 114 of the grommet 110 (i.e., grommet assembly 120). Similar to the grommet 90, the grip enhancement features 115 of grommet 110 may not be activated when smaller cables 150 are used with the grommet 110. However, in some embodiments, when a larger cable 150 is inserted into the interior cavity 94 of the grommet 110, the larger cable 150 will cause the flex retention members 113 to make contact with the grip enhancement features 115, thereby providing additional support to the flex retention members 113 to secure and hold the larger, heavier cable 150 within the grommet 110.

Similar to the grip enhancement features 95 of the grommet 90 described herein, in some embodiments, each grip enhancement feature 115 of grommet 110 may include an aperture 115$a$. The apertures 115$a$ serve a similar purpose to "tune" the spring constant of the grip enhancement feature 115 to help improve flexibility of the grip enhancement feature 115, and thus, improve flexibility of the flex retention members 113.

Figure 8A:
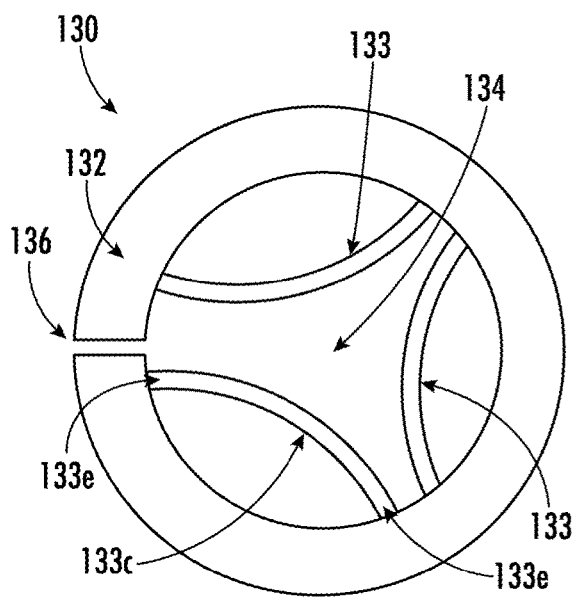
FIG. 8A is a top view of another alternative grommet according to embodiments of the present invention.
Figure 8B:
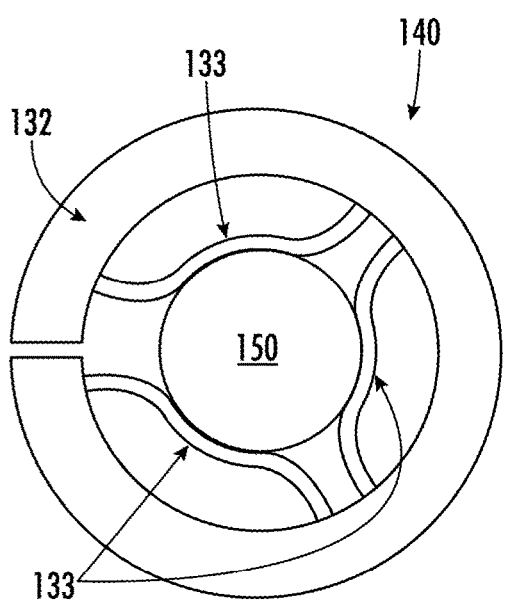
FIG. 8B is a top view of the grommet of FIG. 8A in combination with a cable.

Referring to FIGS. 8A-8B, a grommet 130 and grommet assembly 140 according to embodiments of the present invention are illustrated. Properties and/or features of the grommet 130 and grommet assembly 140 may be as described above in reference to the grommet 70 and grommet assembly 80 shown in FIGS. 5A-5B and duplicate discussion thereof may be omitted herein for the purposes of discussing FIGS. 8A-8B.

Similar to the grommet 70 described herein, the grommet 130 of the present invention has a generally cylindrical main body 132 surrounding an interior cavity 134. The main body 132 of the grommet 130 may have a slot 136 extending along its length which provides an entry point for the cable 150 to be inserted into the interior cavity 134. The grommet 130 also has a plurality of flex retention members 133 extending into the interior cavity 134.

As shown in FIGS. 8A-8B, the grommet 130 differs from grommet 70 in that the flex retention members 133 have a varying thickness compared to the flex retention members 73 of grommet 70 which are illustrated as having a constant thickness. As shown in FIG. 8A, in some embodiments, the end segments 133$e$ of each flex retention member 133 (i.e., the segments of the flex retention members 133 coupled to or integral with the main body 132) have a greater thickness than a center segment 133$c$ of each flex retention member 133 (i.e., the segment of the flex retention member 133 that engages or contacts the cable 150, see, e.g., FIG. 8B). Varying the thickness of the flex retention members 133 may help to increase the strength of the flex retention members 133 while also providing the flexibility to hold different sized cables 150 within the grommet 130. For example, as shown in FIG. 8B, the thicker end segments 133$e$ of each flex retention member 130 may provide additional strength and support to secure larger, heavier cables 150 in the grommet 130 (i.e., the thicker, stiffer end sections 133$e$ may achieve greater retention forces). The thinner center segment 133$c$ of each flex retention member 130 will still have the capability to secure a smaller sized cable 150 in the grommet 130. Varying thickness of the flex retention members 130 may enable the grommet 130 to be "tuned" in the manner described above.

Figure 9A:
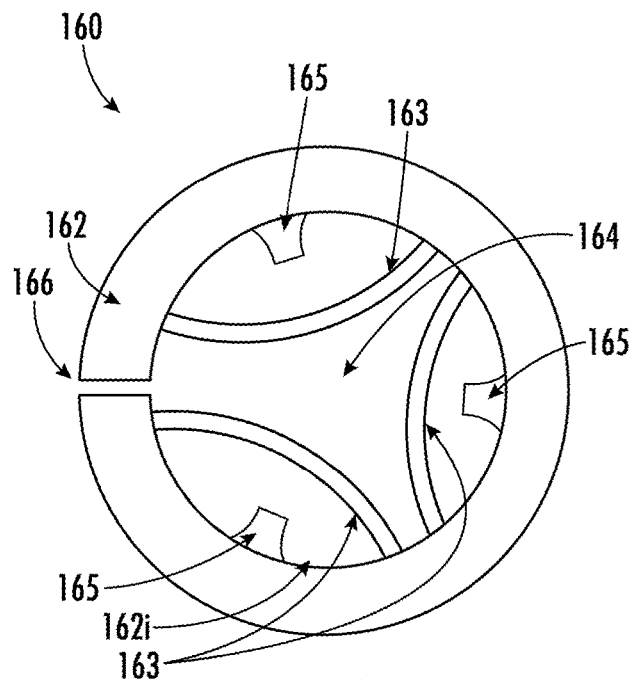
FIG. 9A is a top view of another alternative grommet according to embodiments of the present invention.
Figure 9B:
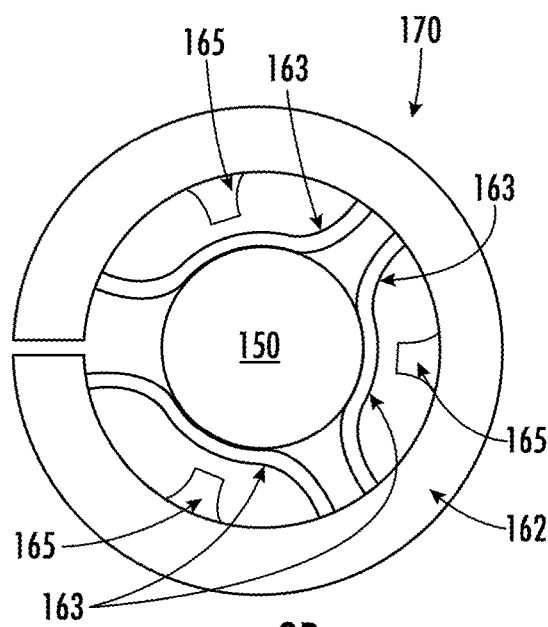
FIG. 9B is a top view of the grommet of FIG. 9A in combination with a cable.

Referring to FIGS. 9A-9B, a grommet 160 and grommet assembly 170 according to embodiments of the present invention are illustrated. Properties and/or features of the grommet 160 and grommet assembly 170 may be as described above in reference to the grommet 110 and grommet assembly 120 shown in FIGS. 7A-7B and duplicate discussion thereof may be omitted herein for the purposes of discussing FIGS. 9A-9B.

Similar to the grommet 110 described herein, the grommet 160 of the present invention has a generally cylindrical main body 162 surrounding an interior cavity 164. The main body 162 of the grommet 160 may have a slot 166 extending along its length which provides an entry point for the cable 150 to be inserted into the interior cavity 164. The grommet 160 also has a plurality of flex retention members 163 extending into the interior cavity 164. The grommet 160 of the present invention also includes one or more grip enhancement features 165 coupled to or integral with an inner surface 162i of the main body 162 of the grommet 160. Each grip enhancement feature extends radially inward toward the interior cavity 164 of the grommet 160.

The grommet 160 differs from grommet 110 in that the cross-section of each grip enhancement features 165 is solid. While each grip enhancement feature 165 is shown in FIGS. 9A-9B as extending from the inner surface 162i of the grommet 165, in some embodiments, each grip enhancement feature 165 may extend radially outwardly from a respective flex retention member 163 (i.e., similar to the grip enhancement features 95 for grommet 90 illustrated in FIGS. 6A-6B).

In addition, the cross-section of each grip enhancement feature 165 can be varied to arrive at a desired spring affect. For example, in some embodiments, as shown in FIGS. 9A-9B, the cross-section of the grip enhancement features 165 may be cone or triangle shape, or the like. In other embodiments, the cross-sectional shape of the grip enhancement features 195 may be I-shaped (like an I-beam). Other cross-sectional shapes may be used. The different cross-sectional shapes of the grip enhancement features 165, as well as the other grip enhancement features 95, 115 described herein, may be used to take advantage of the shape, and buckling nature therefrom, to help provide additional support to the flex retention members 93, 113, 163 when a larger cable 150 is received in the grommet 90, 110, 160. While not shown, it is noted that in some embodiments, different grip enhancement features 95, 115, 165 may be utilized simultaneously. For example, the specific and varied shapes may be used in combination to arrive at a desired spring rate and/or strength of the respective flex retention members 93, 113, 163.

Figure 10A:
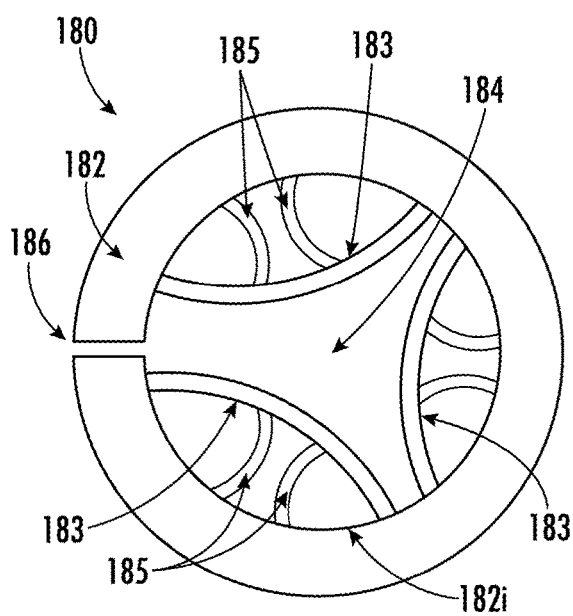
FIG. 10A is a top view of another alternative grommet according to embodiments of the present invention.
Figure 10B:
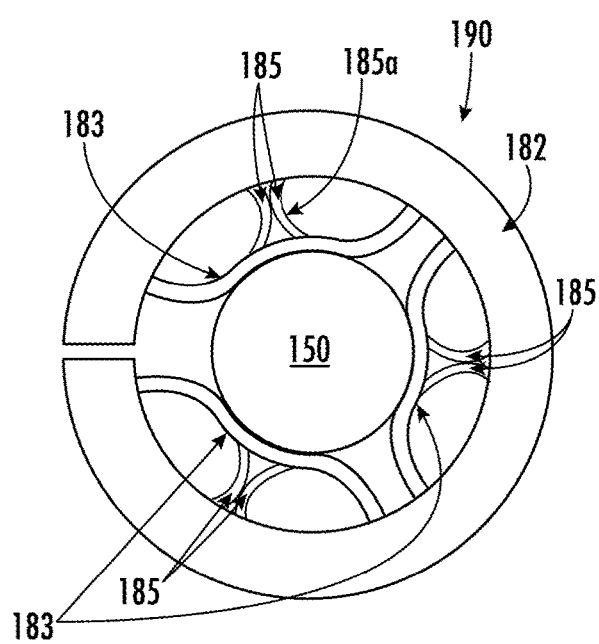
FIG. 10B is a top view of the grommet of FIG. 10A in combination with a cable.

Referring to FIGS. 10A-10B, a grommet 180 and grommet assembly 190 according to embodiments of the present invention are illustrated. Properties and/or features of the grommet 180 and grommet assembly 190 may be as described above in reference to the grommet 70 and grommet assembly 80 shown in FIGS. 5A-5B and duplicate discussion thereof may be omitted herein for the purposes of discussing FIGS. 10A-10B.

Similar to the grommet 70 described herein, the grommet 180 of the present invention has a generally cylindrical main body 182 surrounding an interior cavity 184. The main body 182 of the grommet 180 may have a slot 186 extending along its length which provides an entry point for the cable 150 to be inserted into the interior cavity 184. The grommet 180 also has a plurality of flex retention members 183 extending into the interior cavity 184.

As shown in FIGS. 10A-10B, the grommet 180 differs from grommet 70 in that the grommet 180 includes a pair of grip enhancement features 185 extending from an inner surface 182i of the main body 182 of the grommet 180 to a respective flex retention member 183. As shown in FIG. 10A, in some embodiments, the grip enhancement features 185 may have an arcuate shape. Similar to the grip enhancement features 95, 115, 165 of other grommets 90, 110, 160 described herein, each pair of grip enhancement features 185 of grommet 180 may not be activated when smaller cables 150 are used with the grommet 180. However, as shown in FIG. 10B, in some embodiments, when a larger cable 150 is inserted into the interior cavity 184 of the grommet 180, the larger cable 150 will cause the pairs of grip enhancement features 185 to buckle towards each other. The larger the cable 150, the more the grip enhancement features 185 buckle until the grip enhancement features 185 contact each other at a contact point 185a. When this occurs, the strength and rigidity of the flex retention members 183 may be greatly enhanced resulting in high compressive forces and retention of the cable 150 within the grommet 180.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. A grommet formed of a polymeric material and adapted for securing a cable within a cable hanger, comprising:
    a main body having a generally cylindrical profile surrounding an interior cavity, the main body further having a length, a thickness, and a longitudinal axis;
    a slot extending the length of the main body which provides an entry point for the cable to be inserted into the interior cavity;
    a plurality of flex retention members extending into the interior cavity configured to grip and secure the cable within the interior cavity; and
    one or more grip enhancement features residing between an inner surface of the main body and the flex retention members, wherein the grip enhancement features are configured to provide additional support to the flex retention members when a cable is inserted into the interior cavity,
    wherein each of the one or more grip enhancement features are coupled to or integral with a respective flex retention member and extend radially outwardly therefrom, and wherein each grip enhancement feature is configured to engage or contact the inner surface of the main body when a larger diameter cable is received within the interior cavity of the grommet.

2. The grommet of claim 1, wherein the grip enhancement features have an arcuate shape or a cone or triangular shape.

3. The grommet of claim 1, wherein the flex retention members have an arcuate profile and extend the length of the grommet.

4. The grommet of claim 1, wherein one or more of the grip enhancement features include an aperture.

5. A grommet formed of a polymeric material and adapted for securing a cable within a cable hanger, comprising:
- a main body having a generally cylindrical profile surrounding an interior cavity;
- a slot extending a length of the main body which provides an entry point for the cable to be inserted into the interior cavity;
- a plurality of flex retention members extending into the interior cavity configured to grip and secure the cable within the interior cavity, each flex retention member having a first end and an opposing second end, the first and second ends of each flex retention member coupled to or integral with an inner surface of the main body; and
- one or more grip enhancement features residing between the inner surface of the main body and the flex retention members, wherein the grip enhancement features are configured to provide additional support to the flex retention members when a cable is inserted into the interior cavity,
- wherein each of the one or more grip enhancement features are coupled to or integral with the inner surface of the main body and extend radially inwardly therefrom, and wherein each grip enhancement feature is configured to engage or contact a respective flex retention member when a larger diameter cable is received within the interior cavity of the grommet.

6. The grommet of claim 5, wherein the grip enhancement features have an arcuate shape or a cone or triangular shape.

7. The grommet of claim 5, wherein the flex retention members have an arcuate profile and extend the length of the grommet.

8. The grommet of claim 5, wherein one or more of the grip enhancement features include an aperture.

9. A grommet formed of a polymeric material and adapted for securing a cable within a cable hanger, comprising:
- a main body having a generally cylindrical profile surrounding an interior cavity;
- a slot extending a length of the main body which provides an entry point for the cable to be inserted into the interior cavity;
- a plurality of flex retention members extending into the interior cavity configured to grip and secure the cable within the interior cavity;
- one or more grip enhancement features residing between an inner surface of the main body and the flex retention members; and
- two arms extending radially outwardly from the main body, one arm extending from a bottom edge of the main body and the other arm extending from a top edge of the main body, wherein each arm includes a flanged edge configured to engage the cable hanger when an excessive load force is applied to the cable,
- wherein, when a cable resides within the interior cavity of the main body, the grip enhancement features are configured to provide additional support to the flex retention members to secure and hold the cable within the grommet.

10. The grommet of claim 9, wherein each of the one or more grip enhancement features are coupled to or integral with a respective flex retention member and extend radially outwardly therefrom.

11. The grommet of claim 10, wherein each grip enhancement feature is configured to engage or contact the inner surface of the main body when a larger diameter cable is received within the interior cavity of the grommet.

12. The grommet of claim 9, wherein each of the one or more grip enhancement features are coupled to or integral with the inner surface of the main body and extend radially inwardly therefrom.

13. The grommet of claim 12, wherein each grip enhancement feature is configured to engage or contact a respective flex retention member when a larger diameter cable is received within the interior cavity of the grommet.

14. The grommet of claim 9, further comprising one or more pairs of grip enhancement features, each grip enhancement feature extending from the inner surface of the main body to a respective flex retention member.

15. The grommet of claim 14, wherein each grip enhancement feature in a respective pair of grip enhancement features is configured to buckle toward the other grip enhancement feature when a larger diameter cable is received within the interior cavity of the grommet.

16. The grommet of claim 9, wherein the grommet comprises two pairs of arms extending radially outwardly from the main body, one pair of arms extending from a bottom edge of the main body and the other pair of arms extending from a top edge of the main body.

17. The grommet of claim 16, wherein the position of the top arm on the top edge of the main body is circumferentially spaced apart approximately 180 degrees relative to the position of the bottom arm on the bottom edge of the main body.

18. The grommet of claim 16, wherein the arms of each pair are spaced apart approximately 180 degrees, and wherein the position of the top pair of arms on the top edge of the main body is circumferentially staggered relative to the position of the bottom pair of arms on the bottom edge of the main body.

19. The grommet of claim 9, in combination with a cable hanger, wherein the cable hanger has opposable arms, and wherein the grommet is held between the opposable arms.

* * * * *